United States Patent [19]

Meenan et al.

[11] 4,402,274

[45] Sep. 6, 1983

[54] METHOD AND APPARATUS FOR TREATING POLYCHLORINATED BIPHENYL CONTAMINED SLUDGE

[76] Inventors: William C. Meenan, 330 Douglas Ave., Waukegan, Ill. 60085; George D. Sullivan, 1043 Old Elm La., Glencoe, Ill. 60022

[21] Appl. No.: 355,538

[22] Filed: Mar. 8, 1982

[51] Int. Cl.³ .................................................. F23G 7/00
[52] U.S. Cl. ..................................... 110/346; 110/237; 110/238; 423/481
[58] Field of Search ............... 110/346, 235, 237, 238, 110/236; 423/481

[56] References Cited

U.S. PATENT DOCUMENTS

| | | | |
|---|---|---|---|
| 4,133,273 | 1/1979 | Glennon | 110/237 X |
| 4,140,066 | 2/1979 | Rathjen et al. | 110/235 |
| 4,230,053 | 10/1980 | Deardorff et al. | 110/346 |
| 4,311,103 | 1/1982 | Hiruse | 110/238 |
| 4,331,088 | 5/1982 | Gold | 110/346 |
| 4,361,100 | 11/1982 | Hinger | 110/238 |

*Primary Examiner*—Edward G. Favors
*Attorney, Agent, or Firm*—Mason, Kolehmainen, Rathburn & Wyss

[57] ABSTRACT

A method and apparatus for treating polychlorinated biphenyl contaminated sludge involves heating the sludge, using hot turbulent gas at a temperature in the range of 850° to 2,500° F. with a sludge residence time of about 0.5 to 2 seconds, to separate the polychlorinated biphenyls from the sludge. The particulates are subsequently removed from a PCB entraining gas stream and the PCB's are then burned in a multifuel burner. Pressurized air, fluidized PCB's, and a gaseous fuel are injected into the burning chamber at spaced points along the length of the flame in a direction generally transverse to the direction of the flame to very completely consume the fuel and PCB's.

11 Claims, 3 Drawing Figures

METHOD AND APPARATUS FOR TREATING POLYCHLORINATED BIPHENYL CONTAMINED SLUDGE

BACKGROUND OF THE INVENTION

1. Field of the Invention

This invention relates generally to methods and apparatus for treating polychlorinated biphenyl contaminated sludge, such as the sand, mud, or the like, forming the bottoms of PCB contaminated lakes and streams.

2. Background Art

Since 1978 the manufacture of polychlorinated biphenyls (PCBs) has been banned in the United States. These chemicals have been widely used in the past in transformers, carbonless carbon paper, hydraulic pumps, caulking compounds, inks, paints and insect sprays. A tremendous amount of these chemicals, suspected of causing cancer and birth defects, have been dumped over a number of years in an entirely reckless fashion. Commonly these chemicals were dumped in lakes, streams and waterways where they eventually collected in the bottom material in considerable concentrations.

Because of the method of dumping these chemicals, a tremendous mass of material has been contaminated with these chemicals. In the past, bottom soils or the like contaminated with these fluids have been treated by attempting to burn or by burying them. Because of the nature of the materials in which the PCB contamination is often found, burning is extremely difficult and burying is often only a stop gap measure.

It has been recognized that thermal decomposition of polychlorinated organic compounds is possible despite the very high degree of thermal stability of these compounds. U.S. Pat. No. 4,140,066 discloses a method of decomposing PCB's by exposure to heat in a combustion chamber which operates with extremely intense turbulance and pulsation under temperatures as low as 850° C. and with residence times as short as 0.1 second. However, the patent provides no method or apparatus for dealing with the problem of the treatment of mountainous amounts of contaminated, wet material having a relatively low heating value. Thus while the method set forth in the '066 patent may be highly useful in eliminating PCB containing compounds in relatively small volumes, the process is not particularly helpful in dealing with contaminations on the order of tons in the form of residues in sludge.

A variety of techniques for incinerating waste material are known. The following U.S. Pat. Nos. are exemplary: 4,245,570; 3,858,534; 3,829,558; 3,812,794; 3,716,339; and 3,511,194.

SUMMARY OF THE INVENTION

It is a primary object of the present invention to provide an apparatus capable of separating PCB's from an extremely large quantity of sludge.

It is also an object of the present invention to provide a method and apparatus for treating contaminated river, lake, and waterway bottom material in an efficient and economical way.

These and many other objects and advantages of the present invention are achieved by a method for treating polychlorinated biphenyl contaminated sludge that includes the steps of heating the sludge by exposure to hot gas at a temperature of 850° to 2,500° F., thereby driving the water and polychlorinated biphenyls from the sludge and leaving a dry particulate mass. The PCB material is formed into a gas stream and prepared for burning.

In accordance with another embodiment of the present invention apparatus for treating polychlorinated biphenyl contaminated sludge includes a mixing means for mixing the sludge to be treated. A drying means separates the polychlorinated biphenyls and water from the sludge and includes means for exposing the sludge to a hot gas stream. Another means removes the fine particles from a gas stream. A burner burns the gaseous PCB material. The burner includes means for injecting ambient air and/or oxygen enriched air transversely into the burner flame at spaced points along its length.

DETAILED DESCRIPTION OF THE PREFERRED EMBODIMENT

Figure 1:
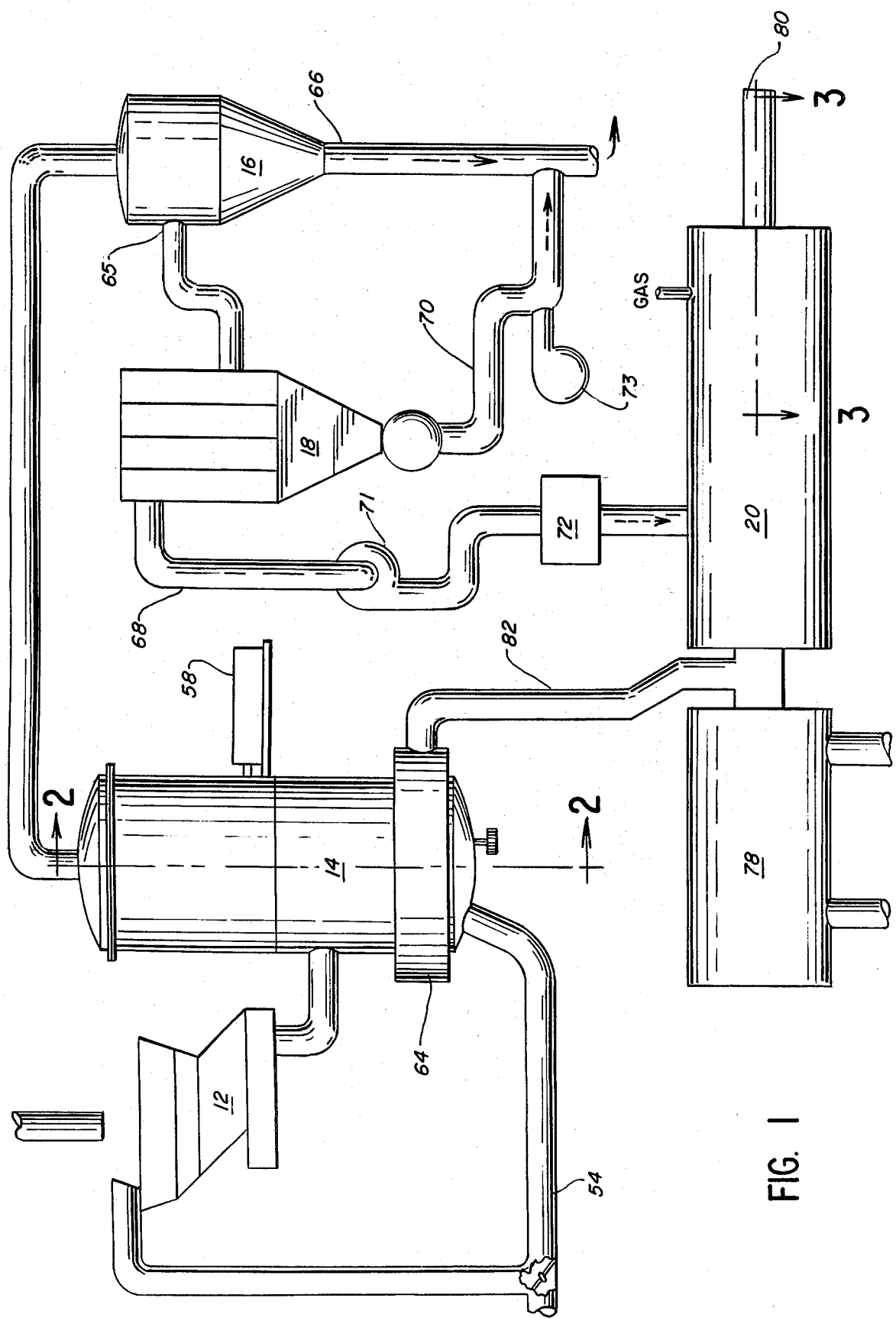
FIG. 1 is a schematic layout of the apparatus in accordance with one embodiment of the present invention.

Referring to the drawing wherein like reference characters are used for like parts throughout the several views, a PCB contaminated sludge treating apparatus 10, shown in FIG. 1, includes a mixer 12, a separator 14, a cyclone separator 16, a bag collector 18, and a furnace 20. Wet or dry sludge contaminated with PCB's is poured into the apparatus 10 through the mixer 12. The nature of the sludge is not critical, and the device is adapted to operate with sand, mud, sewage, organic matter, effluvia and the like, conveniently in the form of bottom dredgings.

Figure 2:
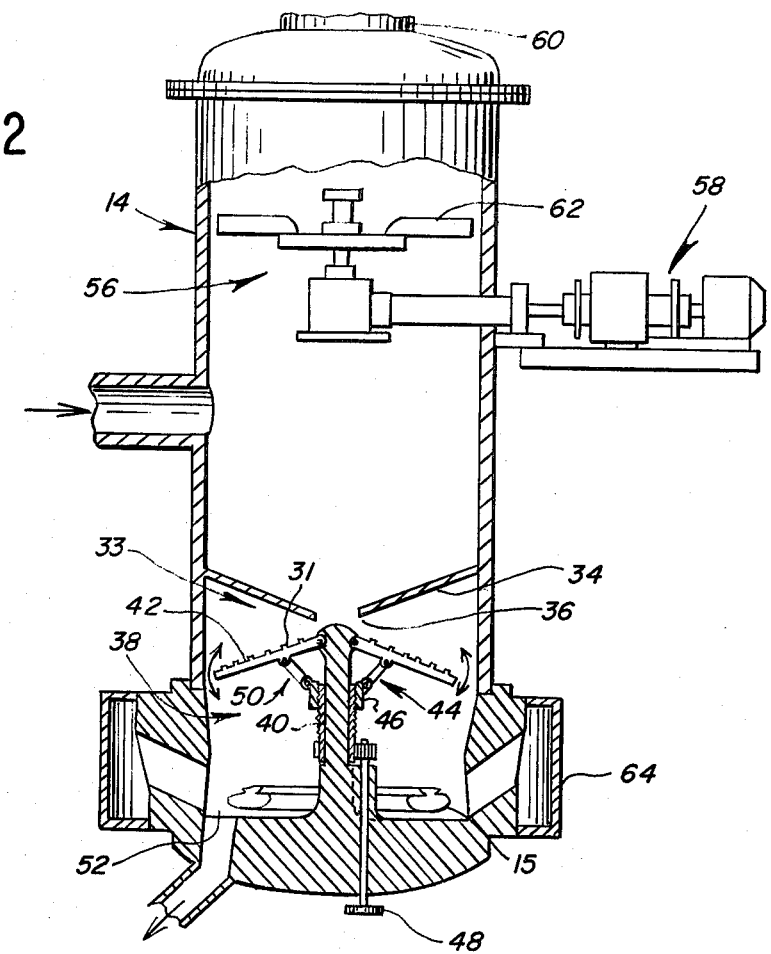
FIG. 2 is an enlarged cross-sectional view taken generally along the line 2—2 in FIG. 1.

The mixer 12 is conveniently a conventional mixer/feeder with a screw feeding mechanism (not shown) arranged generally horizontally within the mixer 12. As the sludge is poured into the mixer 12, it is thoroughly mixer and forwarded into the PCB spearator 14. As shown in FIG. 2, the sludge may be poured in a wet state (including for example 20% solids) into the separator 14 and quickly dried. Very hot air is blown inwardly from the bottom of the spearator 14 through a wind box 64 and allowed to move upwardly through the device, drying the sludge with the hot turbulent air. In addition a burner 15 is provided at the bottom of the separator 15. The air in the separator 14 may be at a temperature of from 850° F. to 2,500° F.; however, to achieve the full advantages of the present invention an operating range of from 1400° F. to 2,000° F. is utilized.

The larger particulate material falls downwardly through the separator 14 at a rate controlled by the delaying apparatus 33. The apparatus 33 includes a first frusto-conical surface 34 angled downwardly so as to direct the particulate matter to a central position adjacent the shaft 24. The particulate matter falls through the aperture 36 onto the umbrella 38, including a plurality of side by side arms 42. The umbrella 38 is generally frustoconical in shape but is directed upwardly so as to receive the particulate matter and to redirect it outwardly towards th periphery of the separator 14. The arms 42 of the frusto-conical umbrella 38 are hingedly secured at their upper ends to a tube 40 surrounding the shaft 24. An umbrella angle adjusting mechanism 44 includes a tube 46 which freely encircles the tube 40 and is arranged for vertical adjustment using a handle 48. A plurality of links 50, connecting the tube 46 to the arms 42 of the umbrella 38, are hingedly connected to both the tube 46 and the arms 42 to permit the angle of the arms 42 to be adjusted, as indicated by the arrows in FIG. 2. The upper surface of each arm 42 includes a plurality of ridges 51 which control the rate of movement of the particulate matter along the surface of the arms 42.

Eventually the particulate matter tumbles off of the edges of the umbrella 38 and collects at the bottom of the separator 14, eventually flowing outwardly thereof through the opening 52. From the opening 52 any particulate matter that contains an excessive PCB concentration is returned by way of the conveyor channel 54 through the action of the diverter valve 55 to the mixer 12. The mixer 12 mixes the dried coarse particulate matter with the incoming wet sludge and feeds the mixture to the separator 14. The adequately treated sludge is returned to its source by away of passage 57.

In the separator 14 the finer, dry particulate matter is propelled upwardly through the spinning product separator 56. The separator 56, rotated in the upper portion of the separator 14 by a motor 58, includes at least two blades 62. The fine particulate matter, entrained in the gas flow out of the separator 14, is propelled upwardly out of the separator 14 through the passage 60. The larger particles are returned to the separator 14 by the product separator 56.

The fine particulates and air entrained PCB material exiting from the separator 14 are conveyed to the conventional cyclone separator 16 which separates the fine particulates from the gas entraining those particulates. The gas exits from the cyclone separator 16 through the opening 65 while the particulates move downwardly through the exit 66. The gas proceeding through the opening 65 passes to a conventional bag collector 18 that removes any remaining particulates in a more thorough fashion. The remaining gas is expelled through the passage 68 while any newly recovered particulates fall downwardly through the passage 70 to join the particulates collected by the cyclone separator 16. The PCB effluvia is then fed to a furnace 20, while particulates are tested for PCB concentration and, if a safe PCB level exists, they are dumped. A charcoal filter 72 is arranged in the passage 68 to provide a final particulate cleaning step.

The gas flow through the entire system is responsive to action of the blower 71 while the movement of the separated particles is responsive to the blower 73. The blower 71 is powerful enough to maintain a vacuum within the separator 14, and is conveniently capable of moving about 13,500 SCFM of hot air.

A suitable multiple fuel burning apparatus for use as the furnace 20 herein is described in U.S. Pat. Nos. 4,273,527 and 3,174,530 both to Cyril F. Meenan, hereby incorporated by reference herein in full. The furnace 20 is capable of burning unconventional fuels of very low heating value, at very high temperatures, for example from 3,500° to 5,000° F.

Figure 3:
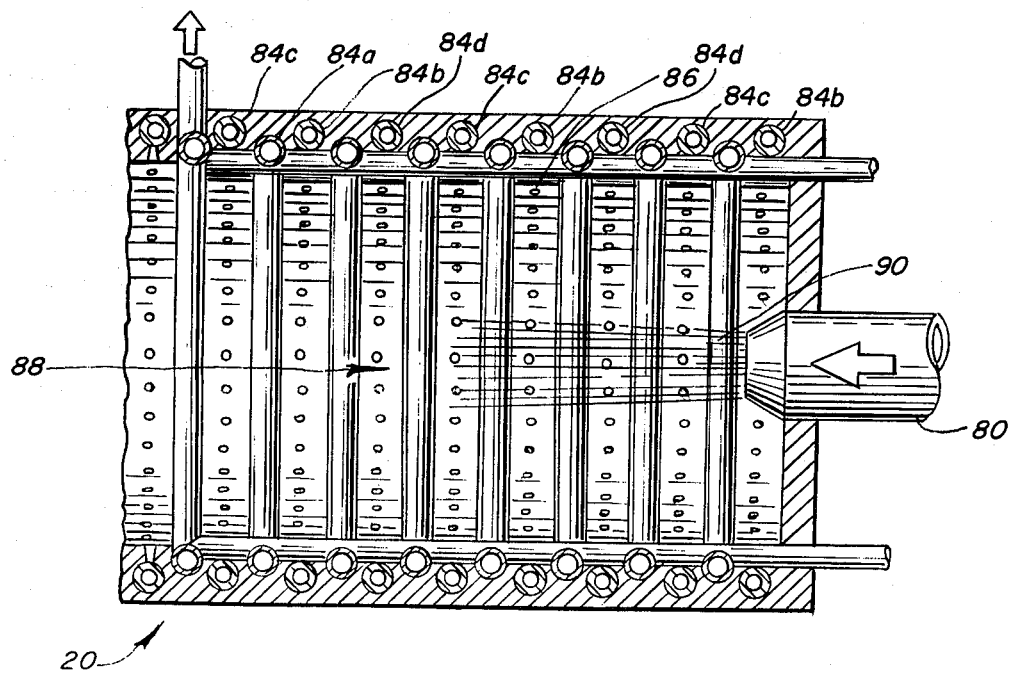
FIG. 3 is an enlarged, partial, cross-sectional view taken generally along the line 3—3 in FIG. 1.

As shown in FIG. 3, the furnace 20 includes a plurality of side by side concentric pipes 84, the pipes 84a conveying water, the pipes 84b conveying pressurized air and/or O$_2$ enriched air, the pipes 84c conveying a pressurized combustible fuel gas such as natural gas or natural gas pre-mixed with O$_2$, and the pipes 84d conveying the PCB effluvia in the form of PCBs entrained in gas. The air in the pipes 84b is conveniently ambient air and/or O$_2$ enriched air. The pipes 84b, 84c, and 84d include a plurality of nozzles 86 arranged to direct the gas flow out of the pipes radially inwardly in a circumferential fashion to the center of the generally tubular combustion chamber 88. Thus, air, natural gas and effluvia are progressively mixed along the length of the axially directed burner flame, emanating from the burner 80, conveniently a natural gas burner, indicated as 90 in FIG. 3. The transversely or radially injected air and gas mix with the axially applied burner flame resulting in very thorough and complete combustion of the PCB's. The water circulating through the pipes 84a is heated in the process and may be used in the boiler 78 to produce superheated water or steam. A portion of the hot flue gases are conducted to the boiler 78 for this purpose. The hot water or steam produced by the boiler 78 is used for operating power generating turbines in a conventional fashion. A portion of the hot combustion gases from the interior of the combustion chamber 88 may also be conducted, by way of the passage 82, to the interior of the separator 14 where they operate to dry the incoming sludge.

Before any flue gases are released to the environment from the boiler 78, they are treated by an emissions control device 92. The device 92, of conventional form, includes chemical scrubbers and/or electrostatic precipitators that remove any hazardous wastes.

The present device has been found to be highly effective in separating PCB's from sludge in the separator 14 and in subsequently destroying the PCB's such that one percent or less of the PCB's remain after final processing. Since all the exhausts from each step in the operation of the apparatus are controlled, these exhausts may be recycled if it is found that their PCB concentration is too high.

The residence time of the sludge within the separator 14 may be controlled by adjusting the angle of the umbrella 38 to control the rate of exhaust of the large particulate matter from the separator 14. To achieve the full advantages of the present invention a residence time of the sludge within the separator 14 on the order of 0.5 to 2 seconds is used. A highly advantageous arrangement utilizes air within the separator 14 at 1800° F. with a residence time of the particulate matter within the roller mill/separator of about 0.5 seconds. At a temperature of 850° F. within the separator 14, a residence time of about 10 seconds is required. The apparatus 10 is capable of processing on the order of 10,000 pounds of sludge per hour.

The foregoing detailed description has been given for clearness of understanding only and no unnecessary limitations should be understood therefrom as many modifications will be obvious to those skilled in the art.

What is claimed and sought ot be secured by the Letter Patent of the United States is:

1. A method for treating polychlorinated biphenyl contaminated sludge comprising the steps of:
   heating the sludge by exposure to hot gas at a temperature of from 850° to 2,500° F. thereby driving the water and the polychlorinated biphenyls from the sludge;
   forming a fluidized stream of the fine particulates and gaseously entrained PCB material; and
   burning the PCB material by transversely injecting the PCB material into a burner flame at spaced points along the length of the flame.

2. The method of claim 1 including the step of mixing the PCB material with fossil fuel during burning.

3. The method of claim 2 including the steps of adding combustible fuel gas and air at spaced points along the length of the burner flame in a direction generally transverse to the flame length.

4. The metod of claim 1 wherein said heating step involves heating the sludge to a temperature of between 1400° and 2000° F. for a period of from 0.5 to 2 seconds.

5. An apparatus for treating polychlorinated biphenyl contaminated sludge comprising:

drying means for separating the polychlorinated biphenyls and water from the sludge, said drying means including means for exposing the sludge to a hot gas stream; and a burner for burning a mixture of the gaseously entrained PCB's and a fossel fuel, said burner including means for injecting air transversely into the burner flame at spaced points along its length.

6. The apparatus of claim 5 wherein the injected air is oxygen enriched air.

7. The apparatus of claim 5 including means for moving a portion of the hot flue gases from the burner into the drying means.

8. The apparatus of claim 5 including means for injecting fuel gas at spaced points along the length of the burner flame in a direction transverse thereto.

9. The apparatus of claim 5 wherein said burner includes means for circulating a heat recovery liquid in said burner.

10. The apparatus of claim 5 wherein said burner includes means for injecting said gaseously entrained PCB's transversely into said burner flame at spaced points along its length.

11. A method for treating polychlorinated biphenyl contaminated sludge comprising the steps of:

heating the sludge by exposure to hot gas at a temperature of from 850° to 2,500° F. thereby driving the water and the polychlorinated biphenyls from the sludge;

forming a fluidized stream of the fine particulates and gaseously entrained PCB material; and separating the gaseously entrained PCB material from the fine particulates.

* * * * *